United States Patent [19]
Brown

[11] Patent Number: 6,010,147
[45] Date of Patent: Jan. 4, 2000

[54] MOTOR VEHICLE AND A MOTOR VEHICLE AIRBAG MODULE

[75] Inventor: Julian Brown, Bromsgrove, United Kingdom

[73] Assignee: Rover Group Limited, Warwick, United Kingdom

[21] Appl. No.: 09/191,584

[22] Filed: Nov. 13, 1998

[30] Foreign Application Priority Data

Dec. 9, 1997 [GB] United Kingdom .................... 9726097

[51] Int. Cl.⁷ ................................................. B60R 21/20
[52] U.S. Cl. ....................... 280/728.2; 280/732; 280/748; 280/752
[58] Field of Search .............................. 280/728.2, 728.1, 280/732, 751, 752, 748

[56] References Cited

U.S. PATENT DOCUMENTS

| | | | |
|---|---|---|---|
| 5,145,207 | 9/1992 | Bederka et al. | |
| 5,310,213 | 5/1994 | Mori | 280/728 A |
| 5,431,442 | 7/1995 | Tomita et al. | 280/752 |
| 5,505,484 | 4/1996 | Miles et al. | 280/728.2 |
| 5,544,912 | 8/1996 | Sommer | 280/728.3 |

FOREIGN PATENT DOCUMENTS

| | | | |
|---|---|---|---|
| 0823353 A1 | 2/1998 | European Pat. Off. | |
| 4-303050 | 10/1992 | Japan | 280/728.2 |

OTHER PUBLICATIONS

Japanese Patent Abstract, vol. 014, No. 407 (M–1019) dated Sep. 4, 1990 & JP 02 155855 A (Toyota Motor Corp), Jun. 14, 1990.

Japanese Patent Abstract, vol. 018, No. 386 (M–1641), dated Jul. 20, 1994 & JP 06 107100 A (Mazda Motor Corp.), Apr. 19, 1994.

*Primary Examiner*—Eric Culbreth
*Attorney, Agent, or Firm*—Davis and Bujold

[57] ABSTRACT

An airbag module 20 is disclosed in which the side walls 28, 29 are formed in two parts 28U,28L; 29U,29L connected together by a one way connection that resists relative motion in one direction but not in another.

11 Claims, 4 Drawing Sheets

MOTOR VEHICLE AND A MOTOR VEHICLE AIRBAG MODULE

FIELD OF THE PRESENT INVENTION

This invention relates to motor vehicles and in particular to an airbag module for a motor vehicle.

BACKGROUND OF THE PRESENT INVENTION

It is well know to provide an airbag module for a motor vehicle having a container for storing an airbag and an inflation means for the airbag. It is a problem with such prior art airbag modules that the container is a rigid member that is not easily deformed.

This can be a disadvantage in a severe impact if the legs of an occupant of the vehicle contact a knee bolster assembly provided to protect the legs against injury and cause it to be pushed into contact with the container. This is because contact of the knee bolster against the rigid container will produce a sudden increase in the load acting against the legs of the passenger.

It is an object of this invention to provide an improved airbag module.

SUMMARY OF THE PRESENT INVENTION

According to a first aspect of the invention there is provided a motor vehicle airbag module for housing an airbag and an inflation means, the module comprising an open ended container defined by a top plate for attaching the module to a structural part of a motor vehicle, a bottom plate, two side walls and a rear wall, the top plate, bottom plate and side walls having front edges defining an aperture through which in use an airbag can be deployed wherein each of the side walls is formed as two parts, a first part connected to the top plate and a second part connected to the bottom plate and are interconnected to each other by means that resist relative movement in one direction but provides no resistance to relative movement in an opposite direction, the interconnection being such that upon the application of a impact force to the bottom plate in a direction towards the top plate the parts of the side wall members slide past each other in a controlled manner thereby allowing the bottom plate to move towards the top plate.

Each first side wall may have at least one hook like member formed thereon for interconnection with a corresponding hook like member extending from the adjacent second side wall member.

Preferably, each hook like member may be formed as an integral part of one of the side wall members.

Each of the hook like members may be formed by bending over a free end of a side wall member.

The top plate may have a pair of upstanding flanges attached thereto used to attach the module to a structural part of a motor vehicle in which case the top plate may be stiffened in the region of the flanges to provide a rigid fixing means for the module.

Advantageously, the bottom plate may have a stiffening rib extending parallel and near to the front edge thereof.

Advantageously, each side wall may have a cut-out therein near to its juncture with the rear wall extending from the bottom plate to a position near to the end of a corrugation so as to form a deformable portion of bottom plate near to its juncture with the rear wall.

The bottom plate may pivot towards the top plate about a transverse axis.

The pivotal movement may be provided by bending of the bottom plate along said transverse axis.

According to a second aspect of the invention there is provided a motor vehicle having a body structure defining an engine compartment and a passenger compartment separated by a firewall, a first structural member connected to the firewall near to an upper edge on the passenger compartment side of the firewall, a second structural member extending between opposite sides of the motor vehicle on the passenger compartment side of the firewall, a knee bolster connected to said second structural member for controlled collapse in the event of an impact above a pre-determined force and an airbag module housing an airbag and an inflation means, the module comprising an open ended container defined by a top plate for attaching the module to said first structural member, a bottom plate, two side walls and a rear wall, the top plate, bottom plate and side walls having front edges defining an aperture through which the airbag can be deployed, wherein each of the side walls is formed as two parts, a first part connected to the top plate and a second part connected to the bottom plate and are interconnected to each other by means that resist relative movement in one direction but provides no resistance to relative movement in an opposite direction, the interconnection being such that upon the application of a impact force to the bottom plate in a direction towards the top plate, the parts of the side wall members slide past each other in a controlled manner thereby allowing the bottom plate to move towards the top plate.

BRIEF INTRODUCTION TO THE DRAWINGS

The invention will now be described by way of example with reference to the accompanying drawing in which.

DESCRIPTION OF THE PRESENT INVENTION

Figure 1:
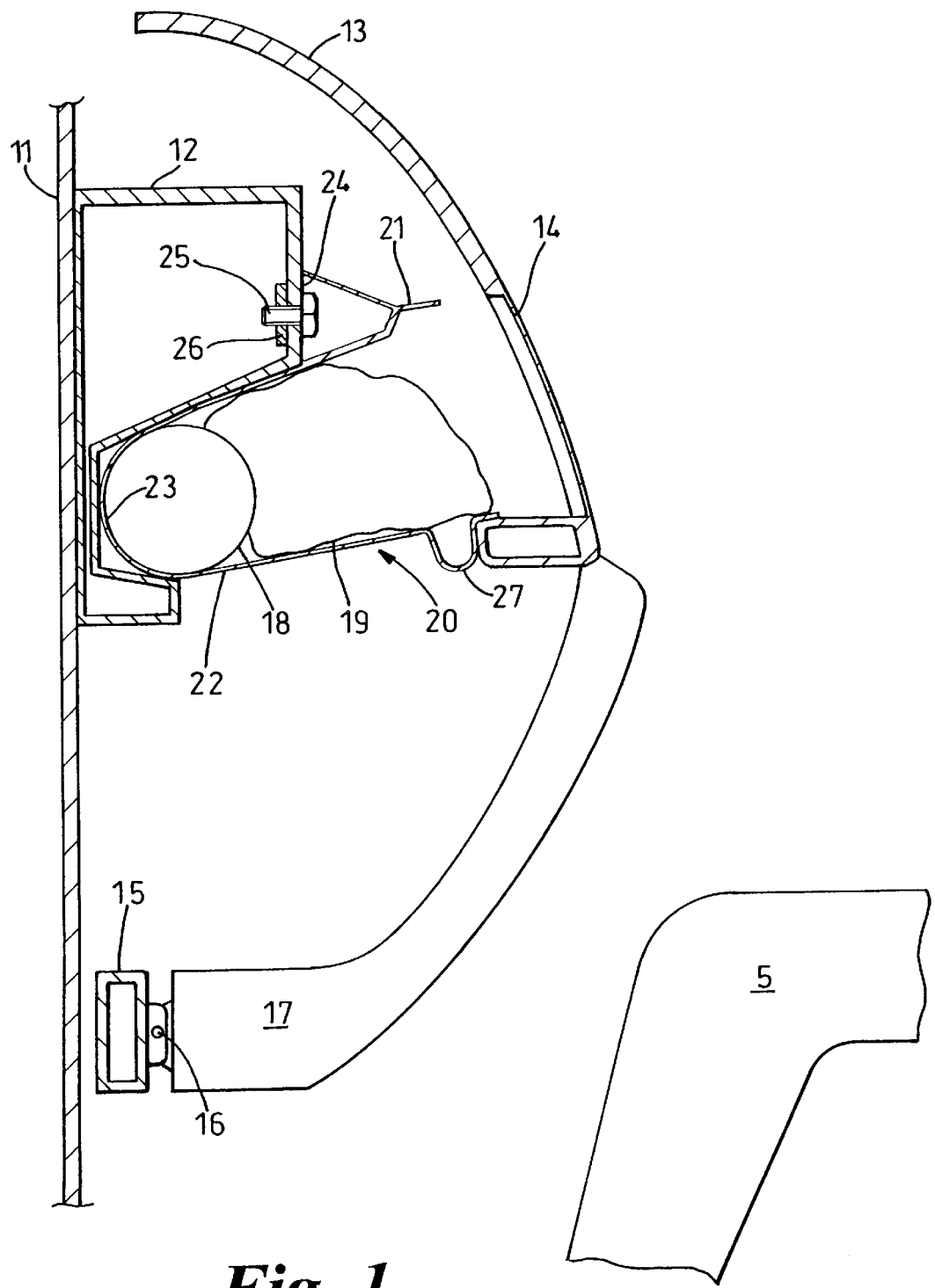
FIG. 1 is a cross-section through a motor vehicle and airbag module according to the invention in a normal use condition.

With reference to the figures a motor vehicle (not shown) has a body structure defining an engine compartment and a passenger compartment separated by a firewall 11. A first structural member in the form of a light alloy box section beam 12 is connected to the firewall 11 near to an upper edge of the firewall 11 on the passenger compartment side of the firewall 11. A second structural member in the form of a cross car beam 15 extends between opposite sides of the motor vehicle where it is connected to 'A' posts (not shown) forming part of the structure of the motor vehicle.

The first structural member 12 is used to provide a strong support means for an airbag module 20 and a fascia member 13. The fascia member 13 has a weakened portion 14 through which an airbag 19 can force its way through during deployment.

The airbag module 20 comprises of a top plate 21, a bottom plate 22, a rear wall 23 and two side walls 28 and 29 which in combination define an open ended container. The top plate, bottom plate and side walls have front edges 21f, 22f, 28f and 29f which define an aperture or mouth through which, in use, the airbag 19 can be deployed.

An airbag inflation means 18 is mounted within the airbag module 20 and is attached to the airbag 19 so as to provide a means for inflating the airbag 19 when required.

The airbag module 20 is connected to the first structural member 12 by means of a pair of spaced apart bolts 25 each of which extends through a respective aperture in an upstanding flange 24 connected to the top plate 21. Each of the bolts is engageable with a respective nut 26 held captive on the inside of the first structural member 12. The top plate 21 is stiffened in the region of the flanges 24 by means of webs 24*b* which ensure that the flanges 24 are securely connected to the top plate 21. Each of the side plates 28, 29 is formed in two parts having an upper part 28U, 29U connected to the top plate 22 and a lower part 28L, 29L connected to the bottom plate 22.

The free ends of the upper and lower parts 28U,29U and 28L, 29L are bent over to form hook shaped connection means 31,32 and 36,37. The hook shaped connection means 31,32 and 36,37 are interengaged so as to provide an interconnection between the upper and lower parts of the side walls 28, 29.

It will be appreciated that movement of the top plate 21 away from the bottom plate 22 is resisted by the interaction between the hook shaped connection means 31, 32 and 36, 37 but that the hook shaped connection means 31, 32 and 36, 37 cannot resist any force urging the bottom plate 22 towards the top plate 21.

Therefore upon deployment of the airbag 19 the hook shaped connection means 31, 32 and 36, 37 resist expansion of the container so as to ensure that the airbag 19 is deployed forwardly out of the aperture at the front of the module. Whereas if a load is applied in an upwardly direction to the bottom plate 22 the hook shaped connection means 31, 32 and 36, 37 cannot resist the applied load and if the applied load is sufficient the bottom plate 22 will be pushed towards the top plate 21, the upper and lower parts 28U, 29U and 28L, 29L sliding over each other.

At the end of each of the lower parts 28L and 29L there is formed a cut-out 33, 34 in the respective side wall 28, 29 so as to provide a relatively easy to deform section 35 in the bottom plate 22.

Near to its front edge 22*f* the bottom plate 22 has a strengthening rib 27 formed therein. The strengthening rib 27 extends for substantially the entire distance between the two side walls 28, 29 and provides a very rigid structure in the region of the front edge 22*f* of the bottom plate 22.

During normal use the airbag module 20 is positioned, as shown in FIG. 1, with the airbag 19 stored within the container in an uninflated state. When the vehicle is involved in a collision the airbag 19 is activated by accelerometer means (not shown) causing the airbag inflation means 18 to be activated thereby filling the airbag 19 with gas. If the collision is severe it is likely that part of the lower leg structure 5 of one of the occupants of the motor vehicle will contact a knee bolster in the form of a glovebox lid 17. The glovebox lid 17 is pivotally connected by means of a pivot 16 to the cross car beam 15.

The object of the knee bolster 17 is to cushion the impact of an occupant's lower leg 5 should it come into contact with part of the motor vehicle. If the collision is particularly severe the knee bolster 17 will contact the lower plate 22 in the region of its front edge 22*f*. Because of the presence of the transverse rib 27 the bottom plate 22 is relatively rigid in this region and therefore is forced upwardly by the impact force applied from the knee bolster 17.

This causes the bottom plate 22 to bend upwardly along a transverse bend line 30 located within the weakened portion 35 thereby allowing it to move towards the top plate 21. The force required to bend the bottom plate 22 along the bend line 30 is relatively low compared to the load that would be required if the top and bottom plates 21 and 22 are rigidly connected and therefore the load transferred through the knee bolster 17 to the lower leg structure 5 of an occupant is relatively low.

Figure 2:
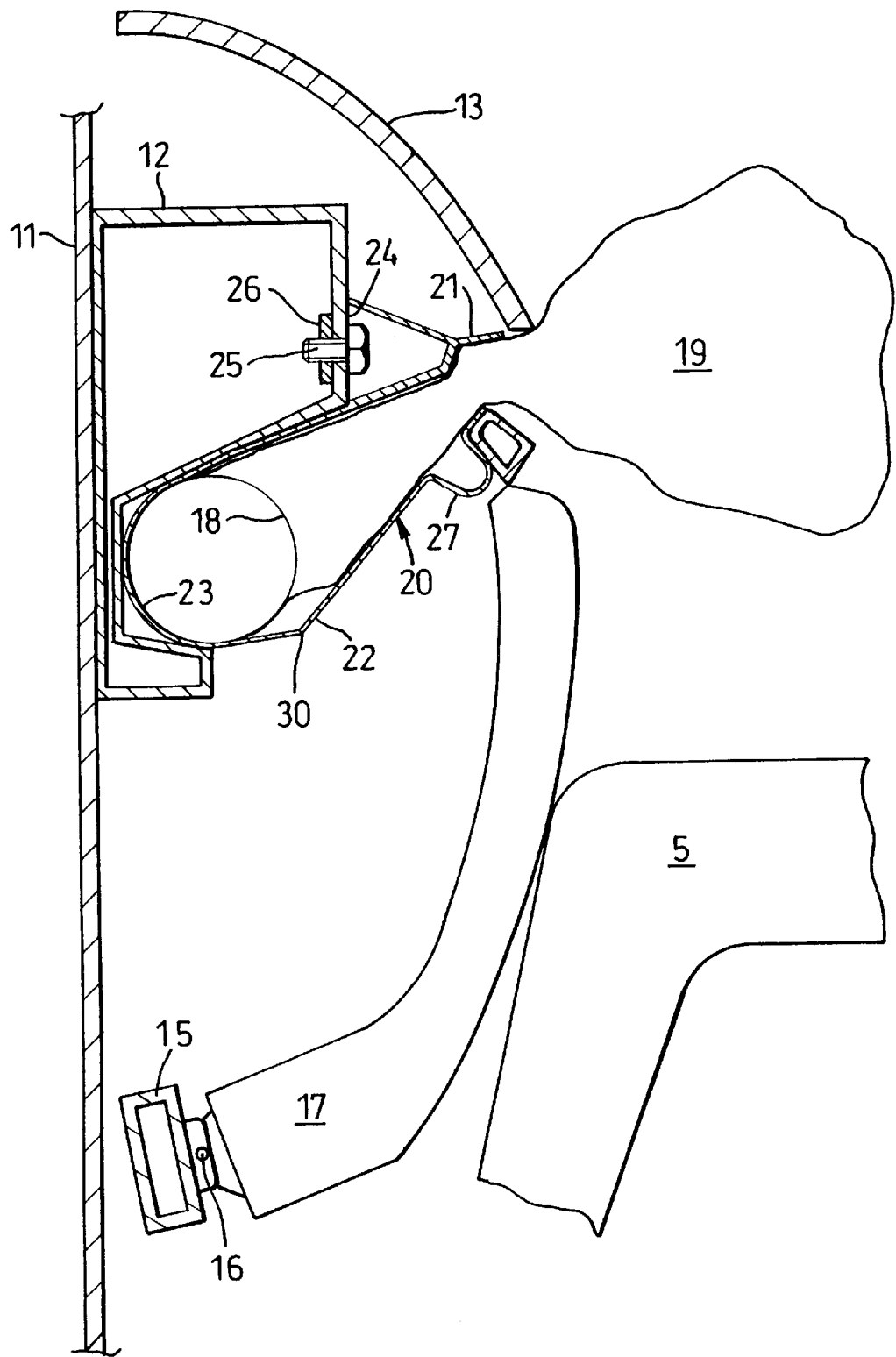
FIG. 2 is a cross-section as shown in FIG. 1 but showing the effect of an impact of a knee bolster against the airbag module.
Figure 3:
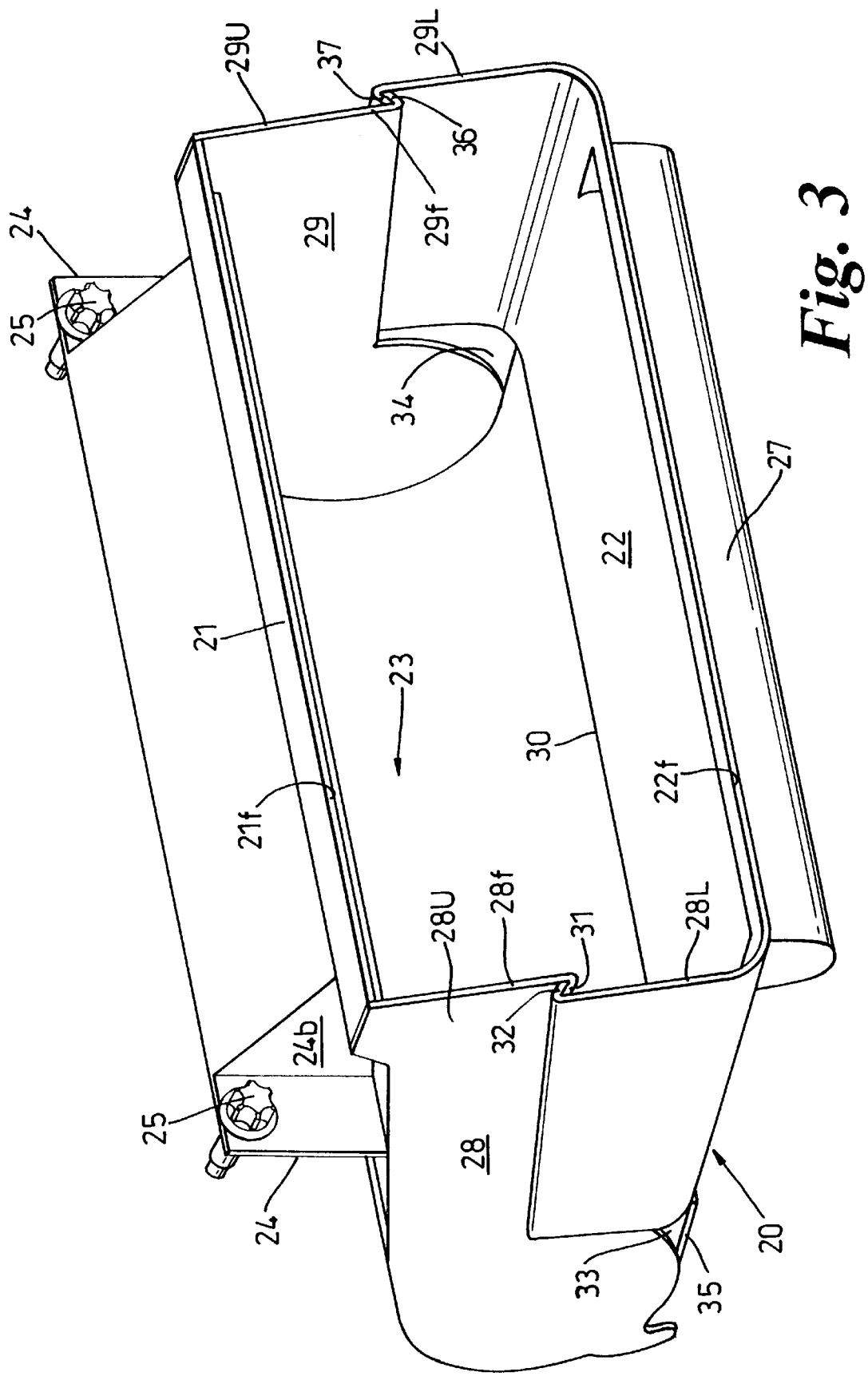
FIG. 3 is a pictorial view of an air bag module container in a normal condition.
Figure 4:
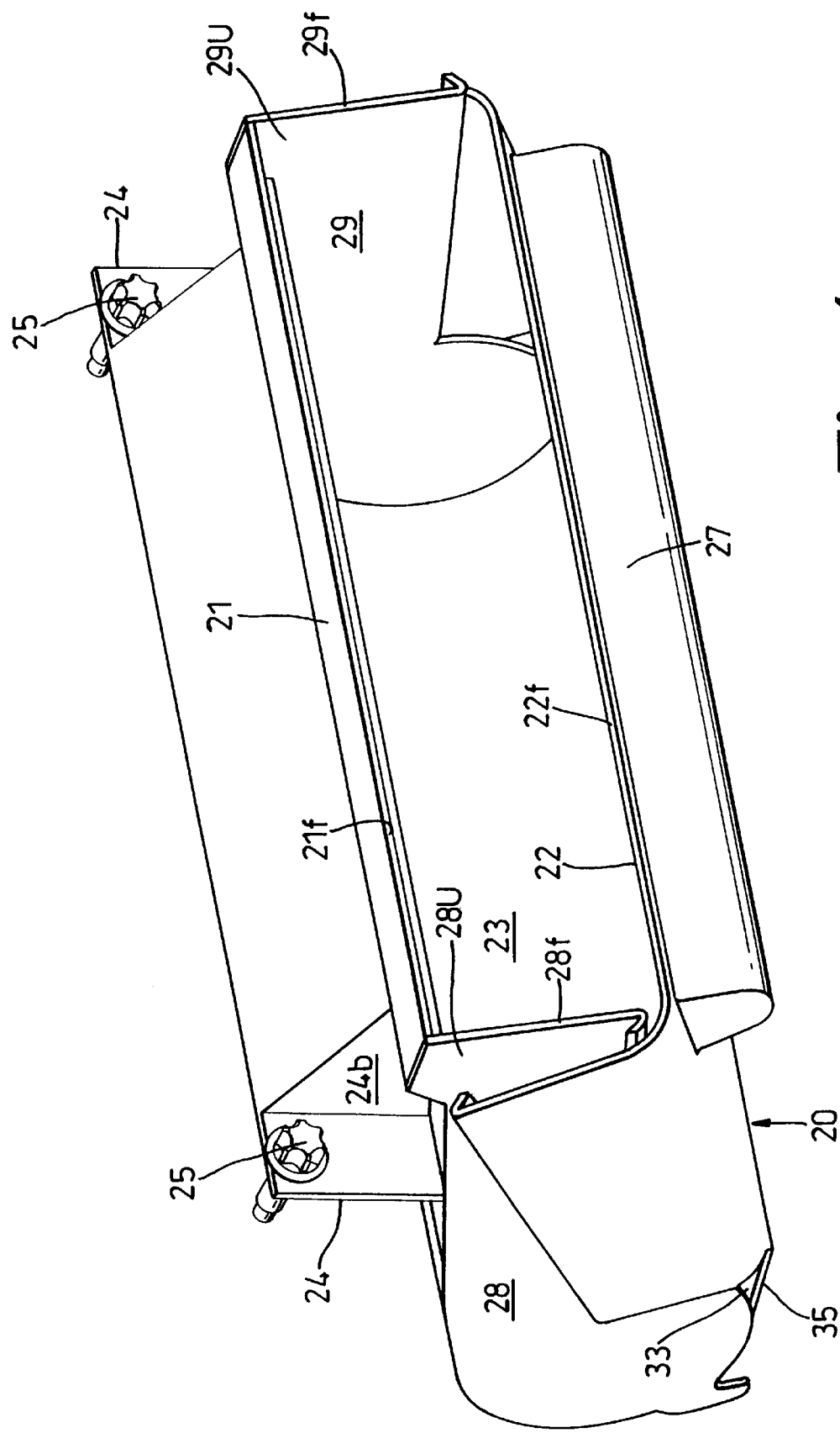
FIG. 4 is a pictorial view of the airbag module container of FIG. 3 showing the effect of an impact upon the container.

At the end of a severe collision the knee bolster 17 occupies the position shown in FIG. 2 having pushed the bottom plate 22 upwardly towards the top plate 21. However the airbag 19 is not unduly affected by this upward movement of the bottom plate 22 and is still able to perform its role in protecting the upper torso and head of an occupant efficiently.

The presence of the transverse strengthening rib 27 performs a useful role in that it prevents random bending or distortion of the lower plate 22 which would make it very much more difficult to control the collapse of the container.

Although the invention has been described in relation to a specific embodiment in which the upper and lower parts of the side walls are interconnected by hook shaped means it will be appreciated by those skilled in the art that alternative connecting means could be used.

I claim:

1. A motor vehicle airbag module for housing an airbag and an airbag inflation arrangement to provide gas to inflate and deploy the airbag, the module comprising an open ended container defined by a top plate for attaching the module to a structural part of a motor vehicle, a bottom plate, two side walls and a rear wall, the top plate, bottom plate and side walls having front edges defining an aperture through which, in use, an airbag can be deployed wherein each of the side walls is formed as two parts, a first part connected to the top plate and a second part connected to the bottom plate and are interconnected and shaped relative to each other to define an interconnection therebetween which resists relative movement in one direction but provides no resistance to relative movement in an opposite direction, the interconnection being such that upon the application of an impact force to the bottom plate in a direction towards the top plate, the parts of the side wall members slide past each other in a controlled manner thereby allowing the bottom plate to move towards the top plate.

2. The module as claimed in claim 1 in which the interconnection is defined in each side wall by at least one hook shaped member interconnected with a corresponding hook shaped member extending from the second part of said side wall.

3. The module as claimed in claim 2 in which each said hook shaped member is formed as an integral part of one of the parts of the side wall members.

4. The module as claimed in claim 3 in which each of the hook shaped members is formed by bending over a free end of each of the parts of each side wall.

5. The module as claimed in claim 1 in which the top plate has a pair of upstanding flanges attached thereto used to attach the module to a structural part of a motor vehicle.

6. The module as claimed in claim 5 in which the top plate is stiffened about the upstanding flanges to provide a rigid fixing for the module.

7. The module as claimed in claim 1 in which the bottom plate has a stiffening rib extending parallel and near to the front edge thereof.

8. The module as claimed in claim 1 in which each of the second side wall parts has a cut out therein at one end so as to form a deformable portion of the bottom plate adjacent the rear wall.

9. The module as claimed in claim 1 in which the bottom plate pivots towards the top plate about a transverse axis.

10. The module as claimed in claim 9 in which said pivotal movement is provided by bending of the bottom plate along said transverse axis.

11. A motor vehicle having a body structure defining an engine compartment and a passenger compartment separated by a firewall, a first structural member connected to the firewall near to an upper edge on the passenger compartment side of the firewall, a second structural member extending between opposite sides of the motor vehicle on the passenger compartment side of the firewall, a knee bolster connected to said second structural member for controlled collapse in the event of an impact above a pre-determined force and an airbag module housing an airbag and an inflation arrangement to provide gas to inflate and deploy the airbag, the module comprising an open ended container defined by a top plate for attaching the module to said first structural member, a bottom plate, two side walls and a rear wall, the top plate, bottom plate and side walls having front edges defining an aperture through which the airbag can be deployed, wherein each of the side walls is formed as two parts, a first part connected to the top plate and a second part connected to the bottom plate and are interconnected and shaped relative to each other to define an interconnection therebetween which resists relative movement in one direction but provides no resistance to relative movement in an opposite direction, the interconnection being such that upon the application of an impact force to the bottom plate in a direction towards the top plate, the parts of the side wall members slide past each other in a controlled manner thereby allowing the bottom plate to move towards the top plate.

* * * * *